(12) United States Patent
Mouri et al.

(10) Patent No.: US 11,442,353 B2
(45) Date of Patent: Sep. 13, 2022

(54) VIRTUAL IMAGE PROJECTION DEVICE

(71) Applicant: Hitachi-LG Data Storage, Inc., Tokyo (JP)

(72) Inventors: Takahiro Mouri, Tokyo (JP); Ryuji Ukai, Tokyo (JP); Takuma Kuno, Tokyo (JP); Toshiteru Nakamura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 17/215,251

(22) Filed: Mar. 29, 2021

(65) Prior Publication Data
US 2021/0373424 A1   Dec. 2, 2021

(30) Foreign Application Priority Data

May 29, 2020   (JP) .............................. JP2020-094047

(51) Int. Cl.
*G03B 21/20* (2006.01)
*G02B 5/00* (2006.01)
*G02B 3/00* (2006.01)

(52) U.S. Cl.
CPC ......... *G03B 21/208* (2013.01); *G02B 3/0056* (2013.01)

(58) Field of Classification Search
CPC .. G02B 3/0056; G02B 3/0037; G02B 3/0062; G02B 27/0101; G02B 27/0961; G03B 21/208
See application file for complete search history.

(56) References Cited

U.S. PATENT DOCUMENTS

| 2014/0002801 A1* | 1/2014 | Miura | G02B 27/102 |
| | | | 353/31 |
| 2016/0363840 A1* | 12/2016 | Mizoguchi | G03B 21/142 |

FOREIGN PATENT DOCUMENTS

WO   2019/107044 A1   6/2019

* cited by examiner

*Primary Examiner* — Ryan D Howard
(74) *Attorney, Agent, or Firm* — Mattingly & Malur, PC

(57) ABSTRACT

A virtual image projection device that generates image light includes a light source that emits light; a microlens array that emits the light, which is emitted from the light source, as light having a predetermined angle distribution; an imaging lens that concentrates the light from the microlens array; a display unit that is irradiated with the light, which is concentrated by the imaging lens, to generate an image; and a projection unit that projects the image, which is generated by the display unit, as image light. The microlens array is disposed such that short side directions of lens cells do not line up straight.

9 Claims, 4 Drawing Sheets

US 11,442,353 B2

VIRTUAL IMAGE PROJECTION DEVICE

CROSS-REFERENCE TO RELATED APPLICATION

The present application claims priority from Japanese application JP2020-094047, filed on May 29, 2020, the contents of which is hereby incorporated by reference into this application.

BACKGROUND OF THE INVENTION

1. Field of the Invention

The present invention relates to a virtual image projection device using a microlens array.

2. Description of the Related Art

As a virtual image projection device, there is known a head mounted display (HMD) that is worn on the head of a user to be used. The HMD is a device that projects an image by a combination of a display unit which displays an image pattern and a projector, and the user can visually recognize a virtual image of the image to acquire various information.

WO 2019/107044 A1 is a related art document related to the technical field. WO 2019/107044 A1 discloses a virtual image projection device that uses a multilens array and an imaging lens to irradiate a display unit with light from a light source unit with high efficiency.

When Koehler irradiation using a microlens array (MLA) is adopted as irradiation of the display unit to obtain high luminance, an image of a surface of the MLA is formed at the exit pupil position of the projector. Since a plane intensity distribution of a light source is reflected in lens cells of the MLA, the intensity distribution periodically appears at an imaging position on the surface of the MLA. The intensity distribution appears as luminance unevenness, which is a problem. In WO 2019/107044 A1, the luminance unevenness is not taken into consideration.

SUMMARY OF THE INVENTION

An object of the invention is to provide a virtual image projection device capable of reducing luminance unevenness.

As one example of the present invention, there is provided a virtual image projection device that generates image light, the device including: a light source that emits light; a microlens array that emits the light, which is emitted from the light source, as light having a predetermined angle distribution; an imaging lens that concentrates the light from the microlens array; a display unit that is irradiated with the light, which is concentrated by the imaging lens, to generate an image; and a projection unit that projects the image, which is generated by the display unit, as image light. The microlens array is disposed such that short side directions of lens cells do not line up straight.

According to the present embodiment, it is possible to provide the virtual image projection device capable of reducing luminance unevenness.

DETAILED DESCRIPTION OF THE PREFERRED EMBODIMENTS

Hereinafter, embodiments of the present invention will be described with reference to the drawings. Incidentally, in the present embodiments, an HMD will be described as one example of a virtual image projection device.

First Embodiment

Figure 1:
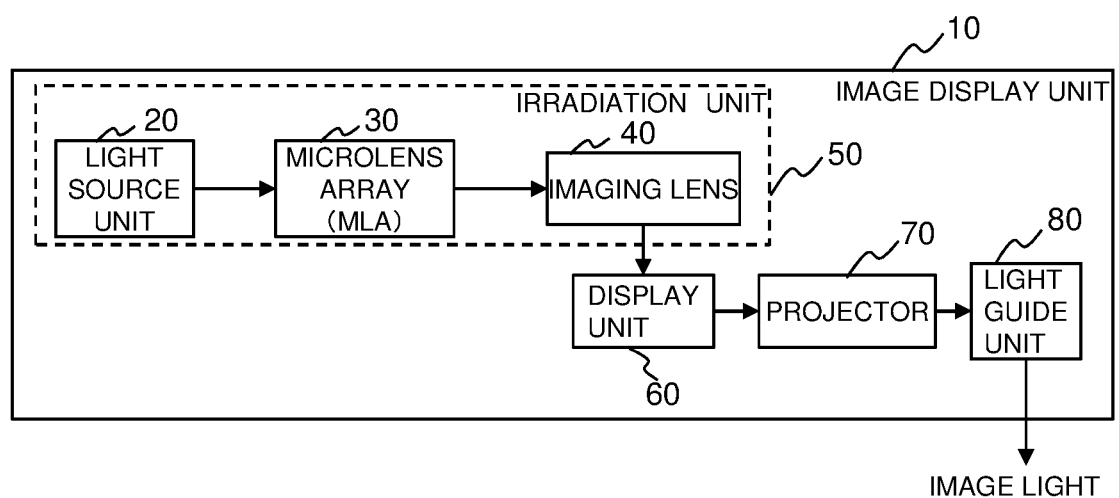
FIG. 1 is a block diagram of an image display unit which is an optical system of an HMD in a first embodiment.

FIG. 1 is a block diagram of an image display unit which is an optical system of an HMD in the present embodiment. In FIG. 1, an image display unit 10 includes an irradiation unit 50 formed of a light source unit 20, an MLA 30, and an imaging lens 40, a display unit 60, a projector 70, and a light guide unit 80. The display unit 60 modulates light incident from the irradiation unit 50 based on an image signal which is separately input, to generate image light in which image information is superimposed. The projector 70 projects the image light from the display unit 60, and the light guide unit 80 guides the image light to a pupil of a wearer. The light guide unit duplicates and widens the image light, so that even when there is a shift in wearing position on the wearer, the image light can reach the pupil of the wearer.

Figure 2:
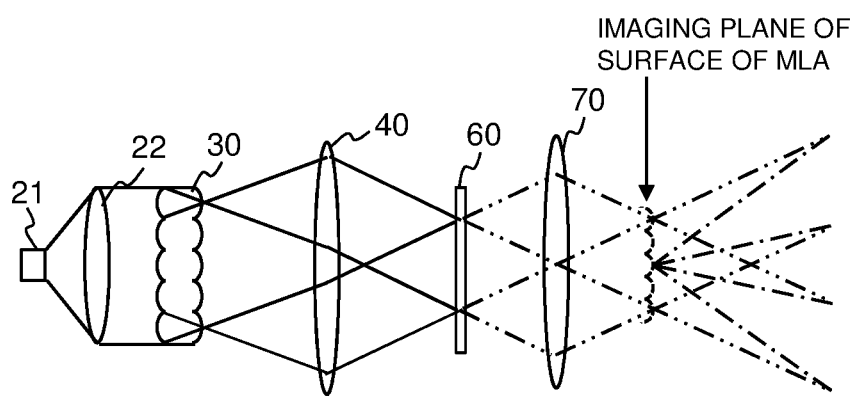
FIG. 2 is a schematic view describing the imaging position of light of the optical system of the HMD in FIG. 1.

FIG. 2 is a schematic view describing the imaging position of light of the optical system in FIG. 1. In FIG. 2, the same configurations as those in FIG. 1 are denoted by the same reference signs. In FIG. 2, the light source unit 20 includes, for example, three LED's as light sources 21 that emit red (R), green (G), and blue (B) light, respectively, and the light emitted from the light sources 21 is concentrated by a concentrating lens 22, and the light fluxes of the colors are synthesized by a color synthesizing unit (not illustrated) to generate irradiation light to provide full-color image light.

The MLA 30 includes a plurality of lenses facing an incident surface and an emitting surface. The lenses provided on the incident surface concentrate substantially parallel light, which is incident, toward the lenses provided on the emitting surface. Meanwhile, the lenses provided on the emitting surface of the MLA 30 emit light having a predetermined angle distribution corresponding to the shapes of apertures of the lenses that are provided on the incident surface to face the lenses provided on the emitting surface, respectively.

The imaging lens 40 forms an image of light fluxes, which are emitted by the MLA 30, toward the display unit 60. Since Koehler irradiation using the MLA 30 is adopted as irradiation of the display unit 60 to obtain high luminance, and the entire region of the display unit 60 is irradiated with an image of the aperture of each of the lenses provided on the incident surface of the MLA 30, an image to be formed is an image in which the images of the lenses are superimposed.

The projection of light from the display unit 60 onto the projector 70 simultaneously results in the formation of an image on the surface of the MLA 30 at the exit pupil position of the projector 70. Since the imaging plane is normally located at a position different from that of a virtual image, the virtual image is not clearly visible in a state where the virtual image is gazed at, but enters the pupil in a blurred state. Since it is difficult to make the luminance of the image on the surface of the MLA 30 uniform, the image is recognized as having luminance unevenness even in a blurred state. The luminance unevenness can be eliminated in such a manner that an adequate diffusion plate is inserted between the MLA 30 and the display unit 60 (desirably in the vicinity of the imaging lens 40) to forcibly blur the image; however, a decrease in efficiency due to diffusion is unavoidable.

Figure 3:
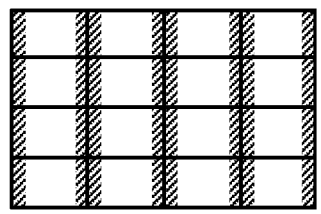
FIG. 3 is a schematic view of the lens cell array of a normal MLA and an image that is visible on a pattern imaging plane of the lens array of the MLA.

FIG. 3 is a schematic view of the lens cell array of a normal MLA and an image that is visible on a pattern imaging plane of the lens array of the MLA.

As illustrated in FIG. 3, lens cells of the normal MLA are aligned vertically and horizontally. Meanwhile, the light emitting region shape of the LED which is a light source generally has a square aspect ratio (1:1), and when the lens cells of the MLA have, for example, an aspect ratio of 16:9, in a combination of the lens cells with such an LED, as illustrated in FIG. 3, the light emitting region shape of the LED is reflected in one lens cell, and the boundaries in a short side direction of the lens cells of the MLA are likely to be dark. Particularly, since the boundaries line up in a row, the boundaries are more noticeable.

Therefore, in the present embodiment, the short side directions of lens cells of the MLA are disposed at least to not line up straight. Accordingly, regularity is reduced and the boundaries are made less noticeable, so that luminance unevenness can be reduced.

Figure 4:
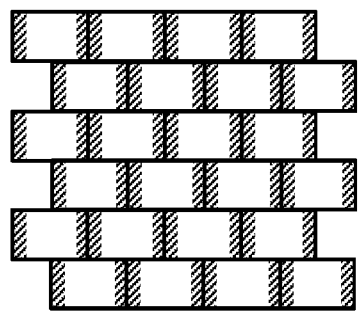
FIG. 4 is a schematic view of a disposition of lens cells of an MLA and an image that is visible on a pattern imaging plane of the lens array of the MLA in the first embodiment.

FIG. 4 is one example of disposition of lens cells of an MLA in the present embodiment. FIG. 4 is an example where the short side directions of the lens cells of the MLA are disposed in a staggered manner.

Figure 5:
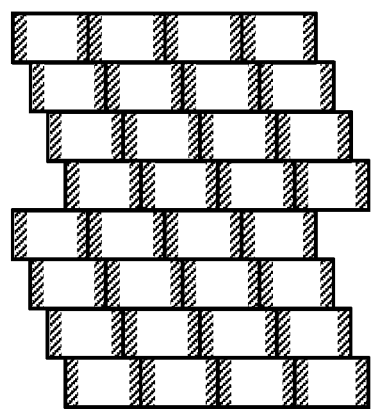
FIG. 5 is a schematic view of another disposition of lens cells of an MLA and an image that is visible on a pattern imaging plane of the lens array of the MLA in the first embodiment.

In addition, FIG. 5 is another example of disposition of lens cells of an MLA in the present embodiment. In FIG. 5, the short side directions of the lens cells of the MLA are disposed to be shifted from each other over a plurality of stages. In FIG. 5, the disposition is such that the short side directions are shifted from each other over four stages and the pattern of shift is repeated.

Incidentally, a mode in which the short side directions of the lens cells of the MLA are disposed to not line up straight is not limited to that in FIG. 4 or 5, and for example, the short side directions may be randomly disposed.

As described above, according to the present embodiment, it is possible to provide the virtual image projection device capable of reducing luminance unevenness.

Second Embodiment

In the present embodiment, when diffraction is used for propagation inside the light guide unit, a reduction of luminance unevenness using the wavelength dependence of diffraction angle will be described.

Figure 6:
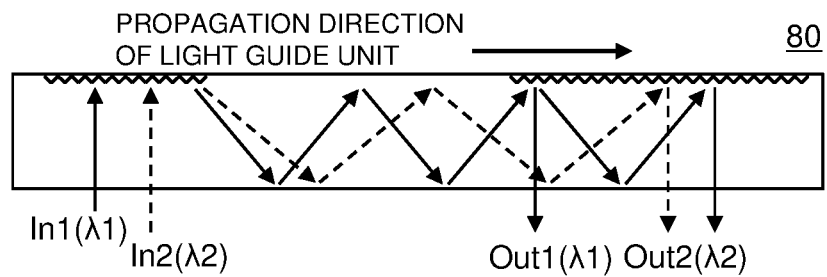
FIG. 6 is a view describing propagation of image light inside a light guide unit when parallel light having a wide spectral distribution is input in a second embodiment.

FIG. 6 is a view describing propagation of image light inside the light guide unit, which is the premise of the present embodiment. In FIG. 6, when image light having a wide wavelength distribution is input as image light to be input, for example, when an input In1 of a wavelength $\lambda 1$ and an input In2 of a wavelength $\lambda 2$ are input to the light guide unit, in the case of diffraction, the wavelength dependence of diffraction angle is strong, and as illustrated, the propagation position is shifted depending on the wavelength. Therefore, the emitted light positions of the light having a wide wavelength distribution (LED or the like) are continuously shifted from each other to overlap each other in a propagation direction which is a horizontal direction in the figure as indicated by Out1 and Out2. However, in FIG. 6, since the imaging plane for the original image is far way and light is substantially parallel, the input light is substantially parallel, and the emitted light is also substantially parallel, so that the emission angles are the same. Here, the eyes of the human recognize the direction (angle) of a point of an object, and recognize a distance using binocular parallax based on the recognized direction or the like to thus recognize a space. Therefore, since an observer recognizes a shift of the image only by angle, a shift of the emitted light position in FIG. 6 does not affect the shift of the image.

Figure 7:
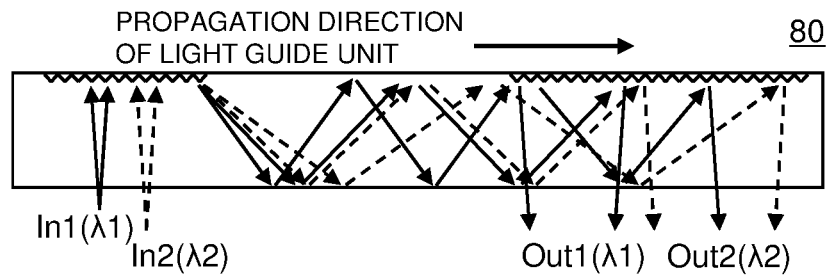
FIG. 7 is a view describing propagation of image light inside the light guide unit when diverging (converging) light having a wide spectral distribution is input from a short distance in the second embodiment.

FIG. 7 is a view describing propagation of image light inside the light guide unit when diverging (converging) light having a wide wavelength distribution is input from a short distance. In FIG. 7, since input signals and output signals are denoted by the same reference signs as those in FIG. 6, but an imaging plane of the surface of the MLA is close to the eyes of an observer, and the light is non-parallel, the input light In1 and In2 is diverging (converging) light, and similar to FIG. 6, the propagation position is shifted depending on the wavelength, so that the emitted light positions are shifted as indicated by Out1 and Out2, and the emission angles are different from each other. Therefore, the shift of the emitted light position is recognized as a shift of the image position, and images shifted in the propagation direction depending on the wavelength overlap each other, so that the images look blurry.

Figure 8:
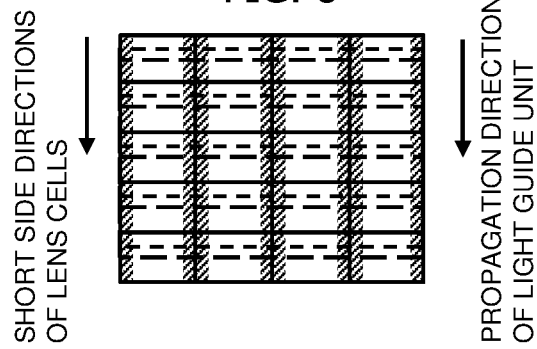
FIG. 8 is a schematic view of an image that is visible on a pattern imaging plane of a lens array when lens cells of an MLA are aligned vertically and horizontally and short side directions coincide with a propagation direction of the light guide unit in the second embodiment.

FIG. 8 is a schematic view of an image that is visible on a pattern imaging plane of a lens array when lens cells of an MLA are aligned vertically and horizontally and short side directions coincide with the propagation direction of the light guide unit in the present embodiment. In a case where the lens cells of the MLA are normally disposed and the short side directions coincide with the propagation direction of the light guide unit, when light having a wide wavelength width from the light source is input to the light guide unit, due to the wavelength dependence of the diffraction angle of the light guide unit, as illustrated in FIG. 8, if the solid line, the dotted line, and the chain line are assumed to have different wavelengths of approximate colors, the image is shifted in the propagation direction of the light guide unit, and is observed. Therefore, luminance unevenness of the image, which is visible on the pattern imaging plane of the lens array of the MLA, in the propagation direction of the light guide unit can be reduced. Incidentally, in FIG. 8, since the luminance unevenness is reduced only in the propagation direction of the light guide unit, a reduction is obtained only in one direction, and the reduction effect is insufficient.

Figure 9:
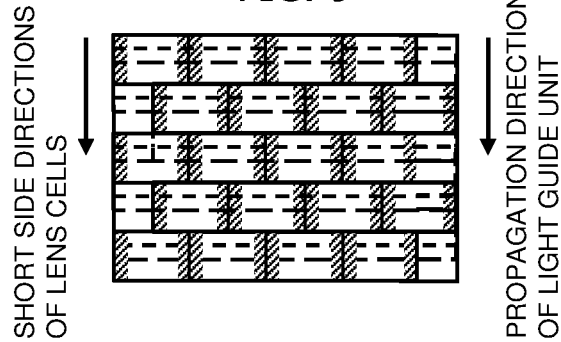
FIG. 9 is a schematic view of an image that is visible on a pattern imaging plane of a lens array when the short side directions of lens cells of an MLA are disposed in a staggered manner and the short side directions coincide with the propagation direction of the light guide unit in the second embodiment.

FIG. 9 is a schematic view of an image that is visible on a pattern imaging plane of a lens array when the short side directions of lens cells of an MLA are disposed in a staggered manner and the short side directions coincide with the propagation direction of the light guide unit in the present embodiment. In FIG. 9, as illustrated in FIG. 4 of the first embodiment, the short side directions of the lens cells of the MLA are disposed in a staggered manner to not line up straight, and the short side directions of the lens cells of the MLA coincide with the propagation direction of the light guide unit. Accordingly, luminance unevenness in two directions can be reduced. In other words, the short side directions of the lens cells of the MLA are disposed to coincide with the propagation direction of the light guide unit, and the short side directions of the lens cells are disposed to be shifted from each other in a direction different from the propagation direction of the light guide unit as being disposed in a staggered manner. Incidentally, in the present embodiment, the short side directions of the lens cells may be disposed to not line up straight, and are not limited to being disposed in a staggered manner. For example, as illustrated in FIG. 5, the short side directions of the lens cells may be disposed to be shifted from each other over a plurality of stages, or may be randomly disposed.

As described above, according to the present embodiment, it is possible to provide the virtual image projection device capable of further reducing luminance unevenness.

Third Embodiment

In the present embodiment, an example where the aspect ratio of the light emitting region shape of the light source is set to be close to the aspect ratio of the lens cells of the MLA to reduce luminance unevenness of an image which is visible on a pattern imaging plane of the lens array of the MLA will be described.

The more the light emitting region shape of the light source is similar to the shape of the lens cells of the MLA, namely, the shape of a region irradiated with light, the smaller dark regions at the boundaries in the short side direction of the lens cells of the image visible on the pattern imaging plane of the lens array are, so that luminance unevenness is reduced. In addition, the more the light emitting region shape of the light source is similar to the shape of the projected image, the larger the light use efficiency is. Naturally, when the aspect ratios of the shapes of the light source, the lens cells, and the projected image coincide with each other, unevenness is minimized and the light use efficiency is maximized, which is most desirable, but it is realistically difficult to make the aspect ratios perfectly coincide with each other.

Therefore, the aspect ratio of the lens cells of the MLA is set to be close to the aspect ratio of the light emitting region shape of the light source, so that luminance unevenness of the image visible on the pattern imaging plane of the lens array of the MLA can be reduced.

In addition, the value of the aspect ratio of the lens cells of the MLA is set between the value of the aspect ratio of the light emitting region shape of the light source and the value of the aspect ratio of the projected image, so that luminance unevenness of the image which is visible on the pattern imaging plane of the lens array of the MLA can be reduced, and the light use efficiency can be also increased.

Figure 10:
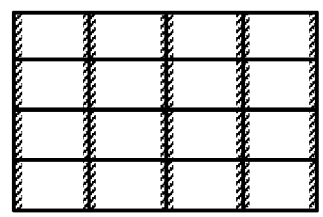
FIG. 10 is a schematic view of an image that is visible on a pattern imaging plane of a lens array when lens cells of an MLA are aligned vertically and horizontally and the aspect ratio of the lens cells of the MLA is close to the aspect ratio of a light emitting region shape of the light source in a third embodiment.

FIG. 10 is a schematic view of an image that is visible on a pattern imaging plane of a lens array when lens cells of an MLA are aligned vertically and horizontally and the aspect ratio of the lens cells of the MLA is close to the aspect ratio of the light emitting region shape of the light source in the present embodiment. As illustrated in FIG. 10, for example, when the light emitting region shape of the LED which is a light source has a square aspect ratio (1:1), if the aspect ratio of the lens cells of the MLA is decreased, as from 16:9 to 16:10, 3:2, 4:3, or 5:4, such that the value of the aspect ratio is close to 1, as compared to the case of FIG. 3, dark regions at the boundaries in the short side direction of the lens cells are further decreased, so that luminance unevenness is reduced.

Figure 11:
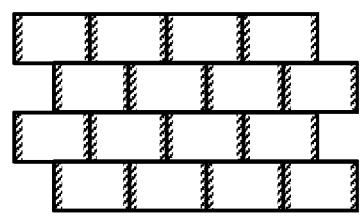
FIG. 11 is a schematic view of an image that is visible on a pattern imaging plane of a lens array when the short side directions of lens cells of an MLA are disposed in a staggered manner and the aspect ratio of the lens cells of the MLA is close to the aspect ratio of the light emitting region shape of the light source in the third embodiment.

In addition, FIG. 11 is a schematic view of an image that is visible on a pattern imaging plane of a lens array when the short side directions of lens cells of an MLA are disposed in a staggered manner and the aspect ratio of the lens cells of the MLA is close to the aspect ratio of the light emitting region shape of the light source in the present embodiment. In FIG. 11, the aspect ratio of the lens cells of the MLA is set to be close to the aspect ratio of the light emitting region shape of the light source similar to FIG. 10, and the short side directions of the lens cells of the MLA are disposed in a staggered manner similar to FIG. 4, so that luminance unevenness can be less noticeable, and a reduction of the luminance unevenness can be realized. Incidentally, in the present embodiment, the short side directions of the lens cells may be disposed to not line up straight, and are not limited to being disposed in a staggered manner. For example, as illustrated in FIG. 5, the short side directions of the lens cells may be disposed to be shifted from each other over a plurality of stages, or may be randomly disposed.

As described above, according to the present embodiment, it is possible to provide the virtual image projection device in which the aspect ratio of the light emitting region shape of the light source is set to be close to the aspect ratio of the lens cells of the MLA to be able to reduce luminance unevenness of the image which is visible on the pattern imaging plane of the lens array of the MLA. In addition, it is possible to provide the virtual image projection device in which the aspect ratio of the lens cells of the MLA is set between the aspect ratio of the light emitting region shape of the light source and the aspect ratio of the projected image to be able to reduce luminance unevenness of the image which is visible on the pattern imaging plane of the lens array of the MLA, and to also increase the light use efficiency.

The embodiments have been described above; however, the present invention is not limited to the above embodiments and includes various modification examples. For example, the above embodiments have been described in detail to help easy understanding the present invention, and the present invention is not necessarily limited to including all of the described configurations. In addition, a part of the configuration of an embodiment can be replaced with the configuration of another embodiment, and the configuration of another embodiment can be added to the configuration of an embodiment. In addition, other configurations can be added to, removed from, or replaced with a part of the configuration of each of the embodiments.

What is claimed is:

1. A virtual image projection device that generates image light, the device comprising:
   a light source that emits light;
   a microlens array that emits the light, which is emitted from the light source, as light having a predetermined angle distribution;
   an imaging lens that concentrates the light from the microlens array;
   a display unit that is irradiated with the light, which is concentrated by the imaging lens, to generate an image;
   a projection unit that projects the image, which is generated by the display unit, as image light; and
   a light guide unit that guides the image light projected from the projection unit,
   wherein the microlens array is disposed such that short side directions of lens cells do not line up straight, and
   wherein the microlens array is disposed such that the short side directions of the lens cells coincide with a propagation direction of the light guide unit.

2. A virtual image projection device that generates image light, the device comprising:
   a light source that emits light;
   a microlens array that emits the light, which is emitted from the light source, as light having a predetermined angle distribution;
   an imaging lens that concentrates the light from the microlens array;
   a display unit that is irradiated with the light, which is concentrated by the imaging lens, to generate an image; and
   a projection unit that projects the image, which is generated by the display unit, as image light,
   wherein the microlens array is such that lens cells are aligned vertically and horizontally, and a value of an aspect ratio of the lens cells is set between a value of an aspect ratio of a light emitting region shape of the light source and a value of an aspect ratio of the projected image projected by the projection unit.

3. The virtual image projection device according to claim 2,
   wherein the aspect ratio of the light emitting region shape of the light source is 1:1, and
   the value of the aspect ratio of the lens cells of the microlens array is an aspect ratio that is closer to 1 than a value of a ratio of 16:9.

4. The virtual image projection device according to claim 2,
   wherein the microlens array is disposed such that short side directions of the lens cells do not line up straight.

5. The virtual image projection device according to claim 2,
   wherein the microlens array is such that short side directions of the lens cells are disposed in a staggered manner.

6. The virtual image projection device according to claim 2,
   wherein the microlens array is such that short side directions of the lens cells are disposed to be shifted from each other over a plurality of stages.

7. The virtual image projection device according to claim 4, further comprising:
   a light guide unit that guides the image light projected from the projection unit,
   wherein the microlens array is disposed such that the short side directions of the lens cells coincide with a propagation direction of the light guide unit.

8. The virtual image projection device according to claim 5, further comprising:
   a light guide unit that guides the image light projected from the projection unit,
   wherein the microlens array is disposed such that the short side directions of the lens cells coincide with a propagation direction of the light guide unit.

9. The virtual image projection device according to claim 6, further comprising:
   a light guide unit that guides the image light projected from the projection unit,
   wherein the microlens array is disposed such that the short side directions of the lens cells coincide with a propagation direction of the light guide unit.

* * * * *